United States Patent
Meslioui

(10) Patent No.: US 12,158,103 B1
(45) Date of Patent: Dec. 3, 2024

(54) COOLING FLOW INJECTION TO ALTER EXHAUST BOUNDARY CONDITIONS IN A TURBO-COMPOUNDED ENGINE

(71) Applicant: Pratt & Whitney Canada Corp., Longueuil (CA)

(72) Inventor: Sid-Ali Meslioui, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/341,223

(22) Filed: Jun. 26, 2023

(51) Int. Cl.
| | |
|---|---|
| F02B 53/14 | (2006.01) |
| F01N 3/05 | (2006.01) |
| F01N 13/00 | (2010.01) |
| F02B 61/04 | (2006.01) |
| F02B 73/00 | (2006.01) |

(52) U.S. Cl.
CPC ............. F02B 53/14 (2013.01); F01N 3/05 (2013.01); F01N 13/002 (2013.01); F02B 61/04 (2013.01); F02B 73/00 (2013.01); *F02B 2730/012* (2013.01)

(58) Field of Classification Search
CPC .... F02B 37/00; F02B 2053/005; F02B 53/14; F02B 61/04; F02B 73/00; F02B 2730/012; F01N 3/02; F01N 3/05; F01N 13/002
See application file for complete search history.

(56) References Cited

U.S. PATENT DOCUMENTS

| | | | |
|---|---|---|---|
| 2,938,338 A * | 5/1960 | Creswick | F02C 7/26 60/790 |
| 3,780,827 A * | 12/1973 | Straight | F02K 1/38 181/216 |
| 7,055,329 B2 | 6/2006 | Martens et al. | |
| 7,954,328 B2 | 6/2011 | Atassi | |
| 9,856,789 B2 | 1/2018 | Bolduc et al. | |
| 11,535,392 B2 | 12/2022 | LaTulipe et al. | |
| 2007/0240415 A1* | 10/2007 | Julien | F02C 6/12 60/39.1 |
| 2018/0045110 A1 | 2/2018 | Thomassin et al. | |

* cited by examiner

*Primary Examiner* — Loren C Edwards
(74) *Attorney, Agent, or Firm* — Carlson, Gaskey & Olds, P.C.

(57) ABSTRACT

A turbo-compounded engine includes a piston engine connected to drive a propulsor. An outlet of the piston engine is operable to connect products of combustion from the piston engine to pass over a turbine. The turbine is connected to drive a turbine shaft also providing rotation to the propulsor. An outlet of the turbine is connected into an exhaust duct configured to exhaust the products of combustion. The exhaust duct is provided with an exhaust duct outer wall defining an exhaust chamber, and a further cooling air outer wall is positioned outwardly of the exhaust duct. Struts connect a cooling chamber between the cooling air outer wall and the exhaust duct outer wall into a center bullet. The center bullet has a downstream end for directing the cooling air into the exhaust chamber at a location upstream of a downstream end of the exhaust duct outer wall.

19 Claims, 3 Drawing Sheets

COOLING FLOW INJECTION TO ALTER EXHAUST BOUNDARY CONDITIONS IN A TURBO-COMPOUNDED ENGINE

BACKGROUND

This application relates to cooling flow injection to alter boundary conditions to reduce exhaust noise in a turbo-compounded engine.

Engines for aircraft applications typically include a propulsor. In some engines a fan is used and in others a propeller.

One type of engine that is showing some promise is a turbo-compounded engine. In a turbo-compounded engine there is typically a piston engine driving the propulsor. Exhaust products downstream of the piston engine pass across a turbine. The rotation of the turbine drives a shaft that also provides propulsion to the propulsor.

Such engines are provided with relatively long exhaust ducts to handle the noise that will be created. Further, the exhaust duct shape needs to fit particular installation challenges for a turboprop.

Another engine type is an auxiliary power unit ("APU"). These engines do not have a propulsor, but may use turbo-compounded engines. Such APU engines also have noise challenges.

In one type of turbo-compounded engine an electric motor also supplements the piston engine. The exhaust noise challenges in such engines are particularly acute.

SUMMARY

A turbo-compounded engine includes a piston engine connected to drive a propulsor. An outlet of the piston engine is operable to connect products of combustion from the piston engine to pass over a turbine. The turbine is connected to drive a turbine shaft also providing rotation to the propulsor. An outlet of the turbine is connected into an exhaust duct configured to exhaust the products of combustion. The exhaust duct is provided with an exhaust duct outer wall defining an exhaust chamber, and a further cooling air outer wall is positioned outwardly of the exhaust duct. A center bullet is received within the exhaust chamber inwardly of the exhaust duct outer wall. Struts connect a cooling chamber between the cooling air outer wall and the exhaust duct outer wall into the center bullet. The center bullet has a downstream end for directing the cooling air into the exhaust chamber at a location upstream of a downstream end of the exhaust duct outer wall.

These and other features will be best understood from the following drawings and specification, the following is a brief description.

DETAILED DESCRIPTION

Figure 1:
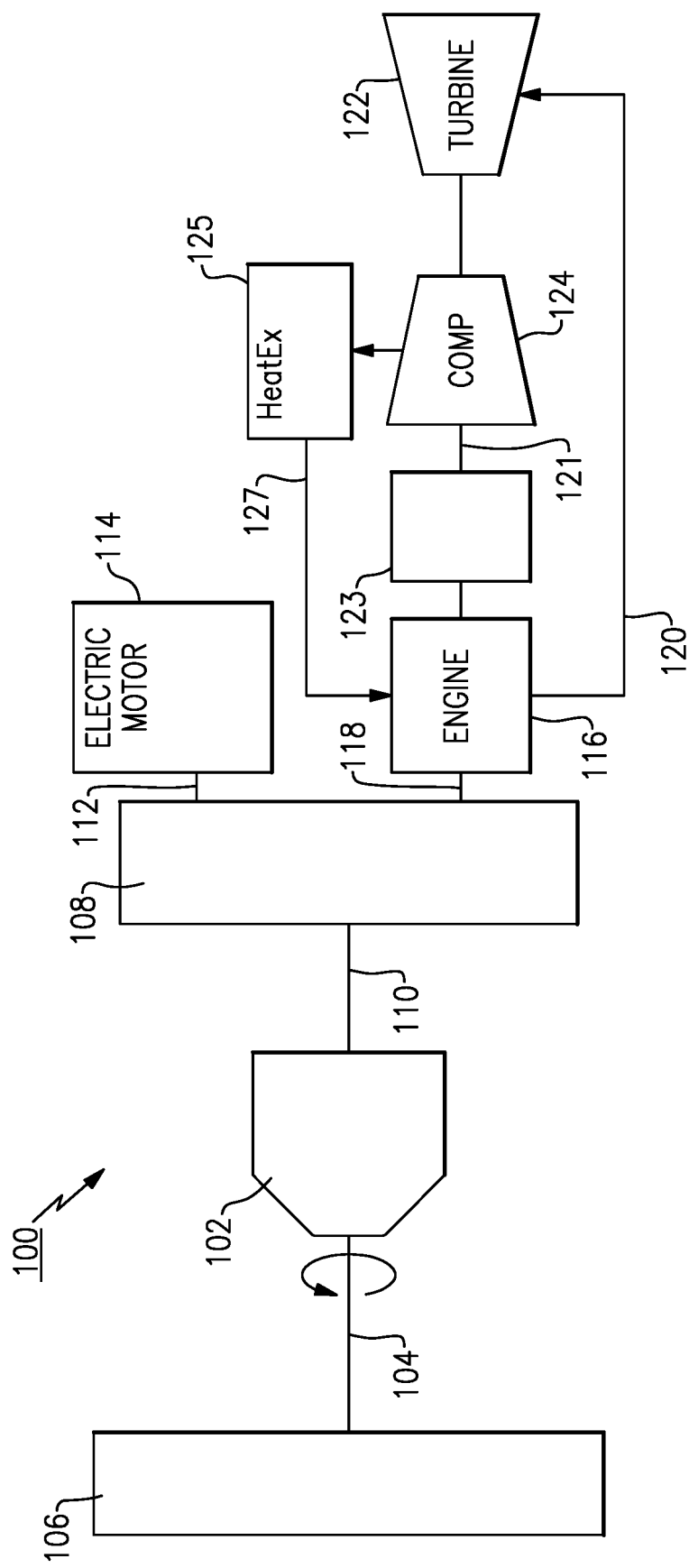
FIG. 1 schematically shows a turbo-compounded engine.

A turbo-compounded engine 100 is illustrated in FIG. 1. A gear reduction 102 is shown schematically driving a shaft 104 at a slower speed than an input shaft 110, to in turn drive a propulsor 106. In embodiments the propulsor 106 could be a propeller. However, it is also within the scope of this application that the propulsor could be a fan. A compound gearbox 108 takes in several sources of drive to in turn drive shaft 110 that drives the gear reduction 102.

An electric motor 114 drives a shaft 112 to provide rotational force into the compound gearbox 108. A piston engine 116 drives a shaft 118 to also provide a source of rotation into the gearbox 108. It is known that the electric motor can provide additional power in combination with the piston engine 116 under certain operational conditions such as high powered conditions. As an example, at takeoff both the electric motor 114 and the piston engine 116 may be utilized. At lower power conditions, such as cruise, perhaps only the electric motor 114 is used.

An exhaust, outlet or line 120 from the piston engine 116 drives a turbine 122. The turbine 122 drives a shaft 121 through the gearbox 123 to provide additional rotational force to a shaft 118. A compound gearbox 123 receives rotation from a shaft 121. The turbine 122 is also shown driving a compressor 124, which is optional. The compressed air from compressor 124 passes through a heat exchanger 125 and then to the piston engine 116 through line 127.

Figure 2:
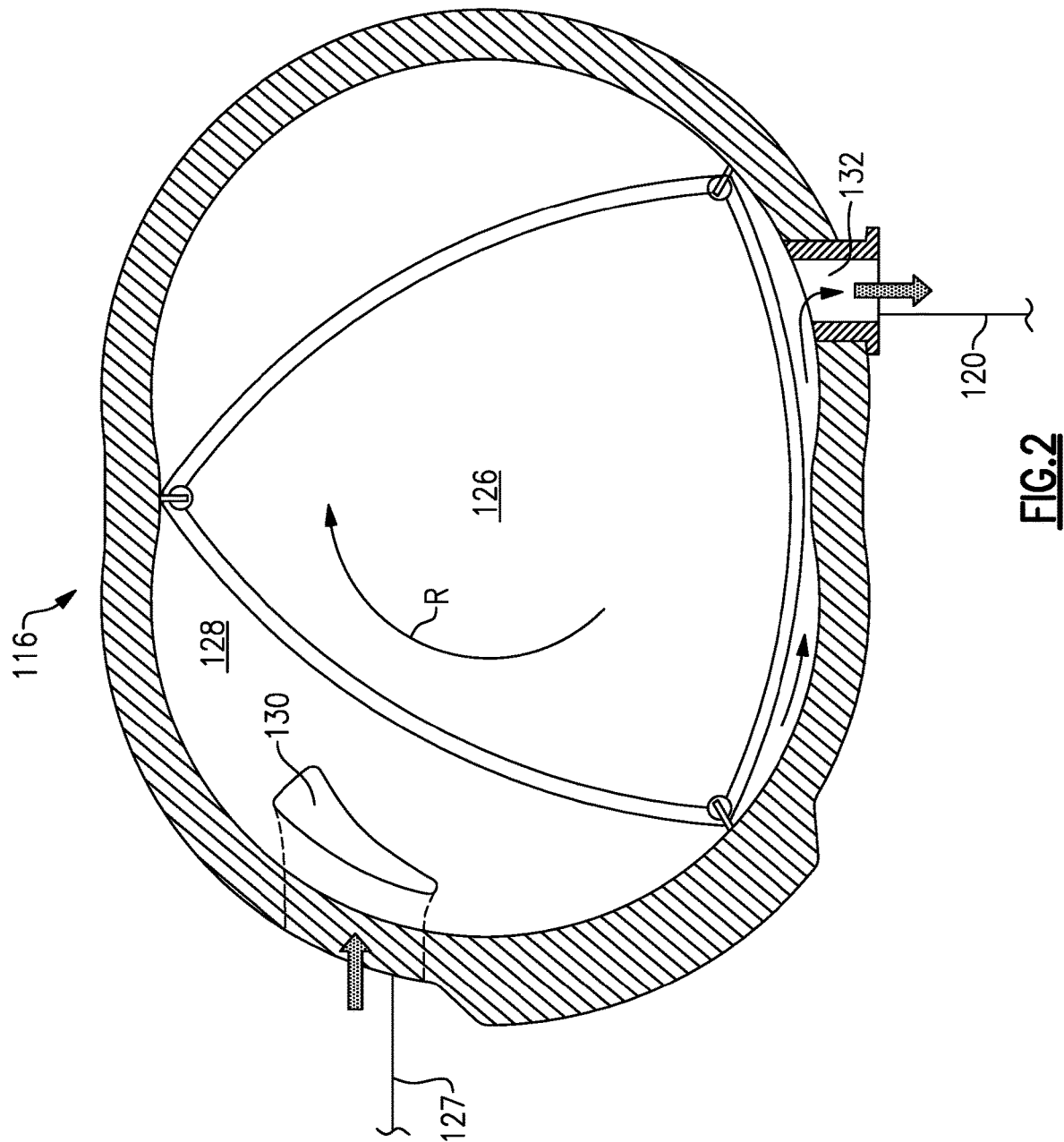
FIG. 2 shows a piston engine incorporated into the turbo-compounded engine of FIG. 1.

FIG. 2 shows an example of the piston engine 116. A rotary piston engine, such as a Wankel engine is illustrated. A piston 126 rotates within a chamber 128. Compressed air from line 127 is injected into the chamber 128 at 130. It is mixed with fuel and ignited and drives the piston 126. The products of combustion pass through outlet 132 and into line 120.

The operation of the engines 100 and 116 provided to date may be as known.

As mentioned above, there are challenges with exhaust noise in such engines, because of the pulsation nature of the rotary core.

It is also known that a turbo-compounded engine could have a piston engine with a plurality of engines such as engine 116 as shown in FIG. 2. Further, it is known that the piston engine could be a reciprocating piston.

Figure 3:
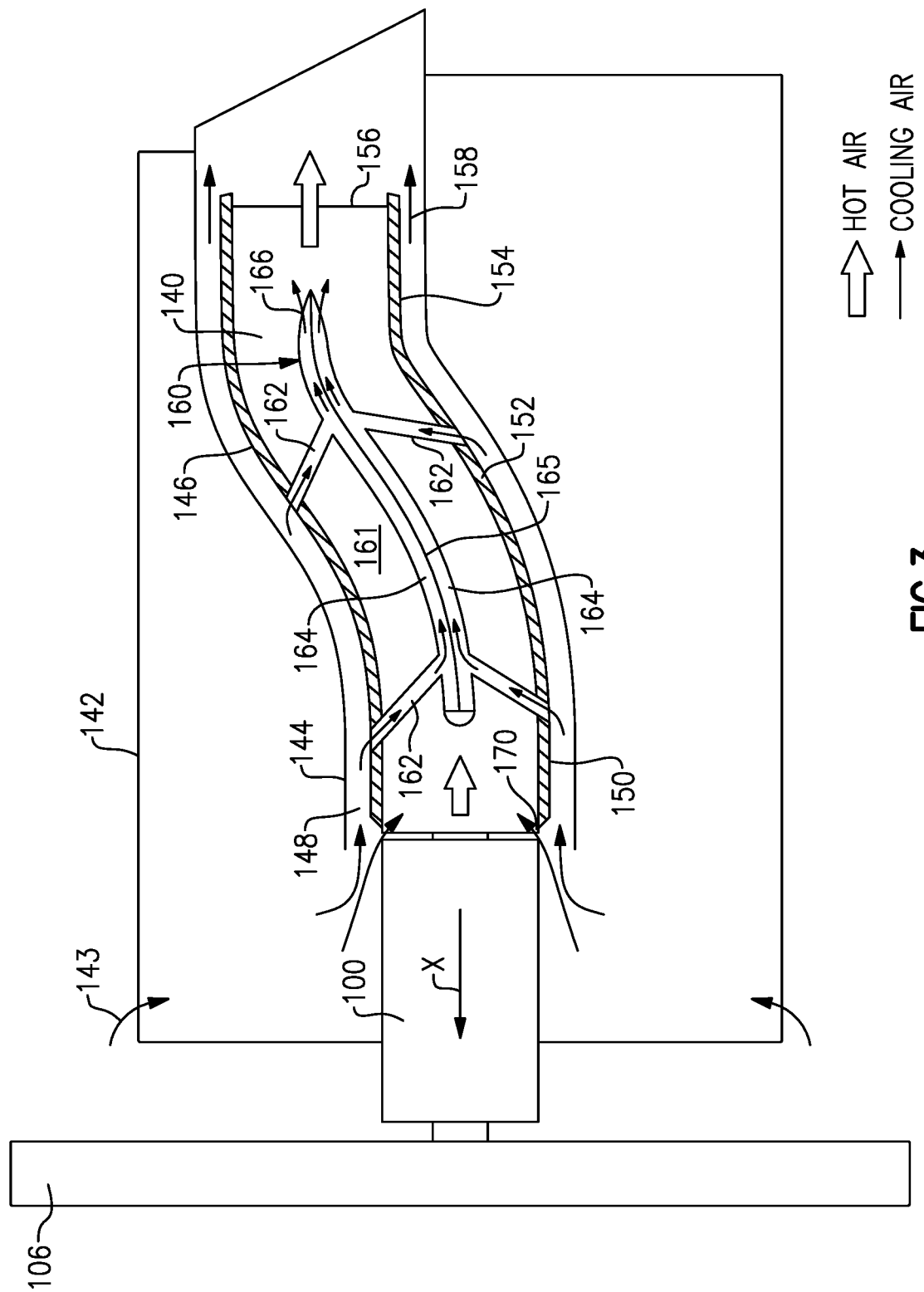
FIG. 3 shows an exhaust duct arrangement for a turbo-compounded engine.

FIG. 3 shows an exhaust for an engine such as engine 100. A nacelle 142 surrounds a core housing 144. The propulsor 106 provides propulsion for an associated aircraft. Propulsor also delivers air into the nacelle as shown at 143. Some of the air passes outwardly of an inner housing 144 to cool the inner housing 144. Another portion of the air enters an inlet providing a cooling chamber 148 defined between the housing 144 and an outer exhaust housing 146. That air passes downstream and through an ejector opening 158.

While a propulsor is shown, the teachings of this disclosure extend to turbo-compounded engines in non-propulsor applications, such as APUs.

The products of combustion leaving the housing 146 provides a jet pump at an exit 156 of the housing 146. This assists in pulling cooling air through the center bullet 160, as described below.

The housing 146 may be thought of as an S-duct arrangement. There is a radially inner first generally axially extending portion 150 leading into a radially outwardly extending portion 152, which then merges into a radially outer generally axially extending portion 154.

The exhaust duct outer housing 146 has a first generally axially extending portion 150 extending axially away from the engine 100 with a component in an axial direction defined by the rotational axis X of the engine. The axial component is greater than a radial component.

The first axial portion 150 merges into a radially extending portion 152. The radially extending portion 152 merges into the second generally axially extending portion 154 extending along a direction with a component that in an axial direction that is greater than a radial component. The radially extending portion 152 extends with an axial component but also having a radial component that is greater than the radial component in both the first and second axially extending portion 150/154.

In an engine such as engine 100, the S-duct must be made relatively long to provide sufficient area for exhaust noise mitigation and reduce exhaust noise. This is particularly true when an electric motor 114 is utilized in the engine 100.

Thus, a center bullet 160 is placed within the chamber 161 defined inwardly of the housing 146. The center bullet 160 has a flow divider 165 dividing the flow into a plurality of separate passages 164. Ducts, or struts, 162 communicate air radially inwardly through the outer wall 146 and into the passages 164. There are axially spaced sets of ducts 162 at upstream and downstream locations. The air delivered into the passages 164 exits at an end 166 into a products of combustion stream in chamber 161.

This air can provide cooling to cool the center bullet 160. However, the main function of the air is to alter sound characteristics. This thus provides a way to alter the tuning frequency without changing the physical dimensions of center bullet 160.

The inner surface of the outer wall 146 may be provided with acoustic treatment such as coatings or structural noise reduction features.

In addition the bullet and cooling air will impact any flow characteristics associated with an acoustic treatment on the outer wall 146, thus allowing changing and adapting the impedance characteristics. Further, some of the cooling air enters into chamber 161 through openings 170 at a forward end of the exhaust duct outer housing 146. This cooling air flows along the inner peripheral wall of the duct 146 to alter a boundary layer, thus improving the acoustic performance of the acoustic treatment.

A turbo-compounded engine under this disclosure could be said to include a piston engine 116 connected to drive a propulsor 106. An outlet 120 of the piston engine is operable to connect products of combustion from the piston engine to pass over a turbine 122. The turbine 122 is connected to drive a turbine shaft 121 also providing rotation to the propulsor 106. An outlet of the turbine is connected into an exhaust duct 146 configured to exhaust the products of combustion. The exhaust duct 146 is provided with an exhaust duct outer wall defining an exhaust chamber, and a further cooling air outer wall 144 is positioned outwardly of the exhaust duct. A center bullet 160 is received within a chamber 161 inwardly of the exhaust duct outer wall. Struts 162 connect a cooling chamber 148 between the cooling air outer wall and the exhaust duct outer wall to the center bullet. The center bullet has a downstream end for directing the cooling air into the exhaust chamber at a location upstream of a downstream end of the exhaust duct outer wall.

Although an embodiment has been disclosed, a worker of ordinary skill in this art would recognize that modifications would come within the scope of this disclosure. Thus, the following claims should be studied to determine the true scope and content of this disclosure.

What is claimed is:

1. A turbo-compounded engine comprising:
    a piston engine connected to drive a propulsor, an outlet of the piston engine being operable to connect products of combustion from the piston engine to pass over a turbine, the turbine being connected to drive a turbine shaft also providing rotation to the propulsor;
    an outlet of the turbine is connected into an exhaust duct configured to exhaust the products of combustion, the exhaust duct being provided with an exhaust duct outer wall defining an exhaust chamber, and a further cooling air outer wall positioned outwardly of the exhaust duct;
    a center bullet received within the exhaust chamber inwardly of the exhaust duct outer wall, and struts connecting a cooling chamber between said cooling air outer wall and said exhaust duct outer wall into the center bullet, the center bullet having a downstream end for directing a cooling air into the exhaust chamber at a location upstream of a downstream end of the exhaust duct outer wall;
    within the center bullet there is a flow divider defining a plurality of passages; and
    wherein the exhaust duct outer wall has a first generally axially extending portion extending axially away from the engine with a first component in an axial direction defined by a rotational axis of the engine, and the first component in the axial direction being greater than a radial component of the first generally axially extending portion, the first generally axially extending portion merging into a radially extending portion, and the radially extending portion merging into a second generally axially extending portion extending along a direction with a second component in the axial direction that is greater than a radial component of the second component of the second generally axially extending portion and the radially extending portion extending with a third component in the axial direction but also having a radial component of the radially extending portion that is greater than the radial component in both the first axially extending portion and the second axially extending portion.

2. The turbo-compounded engine as set forth in claim 1, wherein the piston engine is a rotary engine.

3. The turbo-compounded engine as set forth in claim 1, wherein an electric motor is also provided to selectively drive the propulsor.

4. The turbo-compounded engine as set forth in claim 3, wherein there are axially spaced sets of the struts delivering cooling air into a chamber within the center bullet.

5. The turbo-compounded engine as set forth in claim 4, wherein there are a plurality of passages within the center bullet.

6. The turbo-compounded engine as set forth in claim 4, wherein a nacelle surrounds the cooling air outer wall.

7. The turbo-compounded engine as set forth in claim 4, wherein an ejector is provided by cooling air leaving an exit of the cooling chamber between the exhaust duct outer wall and the cooling outer wall.

8. The turbo-compounded engine as set forth in claim 4, wherein the products of combustion exiting an exit of the exhaust duct outer wall providing a jet pump for assisting in driving the cooling air into and then out of the bullet.

9. The turbo-compounded engine as set forth in claim 4, wherein the turbine shaft further driving a compressor for delivering compressed air into the piston engine.

10. The turbo-compounded engine as set forth in claim 4, wherein a gear reduction is provided between an output shaft driven by the piston engine and the propulsor such that the propulsor rotates at a slower speed than the output shaft.

11. The turbo-compounded engine as set forth in claim 10, wherein a compound gearbox takes in rotation from the electric motor, the piston engine and the turbine and provides a single output shaft leading into the gear reduction.

12. The turbo-compounded engine as set forth in claim 1, wherein an electric motor is also provided to selectively drive the propulsor.

13. The turbo-compounded engine as set forth in claim 12, wherein a gear reduction is provided between an output shaft driven by the piston engine and the propulsor such that the propulsor rotates at a slower speed than the output shaft.

14. The turbo-compounded engine as set forth in claim 13, wherein a compound gearbox takes in rotation from the electric motor, the piston engine and the turbine and provides the output shaft leading into the gear reduction.

15. The turbo-compounded engine as set forth in claim 1, wherein there are axially spaced sets of the struts delivering cooling air into a chamber within the center bullet.

16. The turbo-compounded engine as set forth in claim 1, wherein the plurality of passages is within the center bullet.

17. The turbo-compounded engine as set forth in claim 1, wherein there are openings in the exhaust duct outer wall to allow cooling air into the exhaust chamber and to flow along an inner peripheral surface of the exhaust duct outer wall.

18. A turbo-compounded engine comprising:
a piston engine connected to drive a propulsor, an outlet of the piston engine being operable to connect products of combustion from the piston engine to pass over a turbine, the turbine being connected to drive a turbine shaft also providing rotation to the propulsor;
an outlet of the turbine is connected into an exhaust duct configured to exhaust the products of combustion, the exhaust duct being provided with an exhaust duct outer wall defining an exhaust chamber, and a further cooling air outer wall positioned outwardly of the exhaust duct;
a center bullet received within the exhaust chamber inwardly of the exhaust duct outer wall, and struts connecting a cooling chamber between said cooling air outer wall and said exhaust duct outer wall into the center bullet, the center bullet having a downstream end for directing a cooling air into the exhaust chamber at a location upstream of a downstream end of the exhaust duct outer wall;
wherein the exhaust duct outer wall has a first generally axially extending portion extending axially away from the engine with a first component in an axial direction defined by a rotational axis of the engine, and the first component in the axial direction being greater than a radial component of the first generally axially extending portion, the first generally axially extending portion merging into a radially extending portion, and the radially extending portion merging into a second generally axially extending portion extending along a direction with a second component in the axial direction that is greater than a radial component of the second component of the second generally axially extending portion and the radially extending portion extending with a third component in the axial direction but also having a radial component of the radially extending portion that is greater than the radial component in both the first axially extending portion and the second axially extending portion.

19. A turbo-compounded engine comprising:
a piston engine connected to drive a propulsor, an outlet of the piston engine being operable to connect products of combustion from the piston engine to pass over a turbine, the turbine being connected to drive a turbine shaft also providing rotation to the propulsor;
an outlet of the turbine is connected into an exhaust duct configured to exhaust the products of combustion, the exhaust duct being provided with an exhaust duct outer wall and defining an exhaust chamber, and a further cooling air outer wall positioned outwardly of the exhaust duct;
a center bullet received within a chamber inwardly of the exhaust duct outer wall, and struts connecting a cooling chamber between said cooling air outer wall and said exhaust duct outer wall into the center bullet, the center bullet having a downstream end for directing a cooling air into the exhaust chamber at a location upstream of a downstream end of the exhaust duct outer wall;
wherein the exhaust duct outer wall has a first generally axially extending portion extending axially away from the engine with a first component in an axial direction defined by a rotational axis of the engine, and the first component in the axial direction being greater than a radial component of the first generally axially extending portion, the first generally axially extending portion merging into a radially extending portion, and the radially extending portion merging into a second generally axially extending portion extending along a direction with a second component in the axial direction that is greater than a radial component of the second component of the second generally axially extending portion and the radially extending portion extending with a third component in the axial direction but also having a radial component of the radially extending portion that is greater than the radial component in both the first axially extending portion and the second axially extending portion;
wherein there are axially spaced sets of the struts delivering cooling air into the center bullet; and
wherein there are a plurality of passages within the center bullet.

* * * * *